United States Patent [19]

Ueyama et al.

[11] Patent Number: 4,855,389

[45] Date of Patent: Aug. 8, 1989

[54] PROCESS FOR PRODUCING PHOSPHONITRILE OLIGOMERS CONTAINING MALEIMIDOPHENOXY GROUP

[75] Inventors: Shinichiro Ueyama, Tokyo; Masayuki Furukawa, Saitama; Tadaichi Nishikawa, Kamakura, all of Japan

[73] Assignee: Shin Nisso Kako Co., Ltd., Japan

[21] Appl. No.: 90,368

[22] Filed: Aug. 28, 1987

[30] Foreign Application Priority Data

Aug. 29, 1986 [JP] Japan .................................. 61-201319

[51] Int. Cl.$^4$ ............................................ C08G 79/04
[52] U.S. Cl. .................................... 528/168; 526/262; 526/275; 528/169; 528/170; 548/413; 564/13
[58] Field of Search ...................... 528/168, 169, 170; 548/413; 564/13

[56] References Cited

U.S. PATENT DOCUMENTS 4,550,177 10/1985 Kumar et al. ...................... 548/413
4,806,606 2/1989 Lukacs ............................... 528/168
4,806,607 2/1989 Lukacs ............................... 528/168

OTHER PUBLICATIONS

Kumar et al, "High-Strength Fire- and Heat-Resistant Imide Resins Containing Cyclotriphosphazene and Hexafluoro-isopropylidene Groups", *The Journal of Polymer Science: Polymer Chemistry Edition*, vol. 22, 927–942, (1984).

Kumar et al, "Fire- and Heat-Resistant Polymer Based on Maleimido Substituted 2,2-bis(anilino)-4,4,6,6-tetrakis-(4-Aminophenoxy)-Cyclotriphosphazene", *The Journal of Polymer Science: Polymer Chemistry Edition*, vol. 22, 1141–1151, (1984).

Kumar et al, "Bis-, Tris-, and Tetrakis-Maleimidophenoxy Triphenoxycyclotriphosphazene Resins for Fire- and Heat-Resistant Applications", *Journal of Polymer Science: Polymer Chemistry Edition*, vol. 21, 3155–3167, (1983).

Kumar et al, "Maleimido Substituted Cyclotriphosphazene Resins for Fire and Heat Resistant Composites", 28th National SAMPE Symposium, Apr. 12–14, 1983, pp. 687–699.

Kumar et al, Fire- and Heat-Resistant Laminating Resins Based on Maleimido Substituted Aromatic Cyclotriphosphazenes, *Macromolecules*, vol. 16, No. 8, (1983), pp. 1250–1257.

*Primary Examiner*—Harold D. Anderson
*Attorney, Agent, or Firm*—Lowe, Price, LeBlanc, Becker & Shur

[57] ABSTRACT

This invention relates to a process for producing phosphonitrile oligomers containing maleimido phenoxy groups.

8 Claims, No Drawings

PROCESS FOR PRODUCING PHOSPHONITRILE OLIGOMERS CONTAINING MALEIMIDOPHENOXY GROUP

BACKGROUND OF THE INVENTION

1. Field of the Invention

This invention concerns phosphonitrile oligomers containing maleimidophenoxy group and their intermediate products as starting material for polymers excellent in heat resistance and fire resistance, as well as concerning a novel process for producing these compounds.

2. Description of the Prior Art

Phosphonitrile oligomers obtained by reacting a phosphonitrile chloride oligomer having a cyclic or linear structure

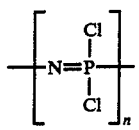

where n represents an integer of 3 or greater, particularly, a cyclic phosphonitrile chloride oligomer wherein n is 3 or 4, namely,

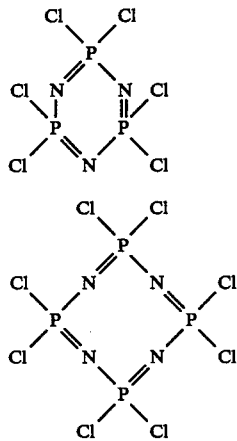

or a mixture of phosphonitrile chloride oligomers containing them as the main ingredient with an organic hydroxy compound, or polymers obtained through the polymerization of them are excellent in heat-resistance, cold-resistance, lubricity, electrical insulation or chemical stability. Accordingly, application uses for these compounds have been developed generally as various kinds of industrially materials.

It is said that, among these phosphonitrile oligomers, those polymers obtained by the thermal polymerization of hexakis(4-maleimidophenoxy)cyclotriphosphazene represented by the formula

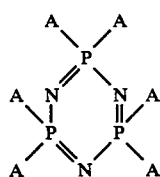

(I)

where A represents

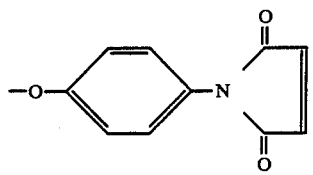

or a tris(4-maleimidophenoxy)-tris(phenoxy)cyclotriphosphazene represented by the formula

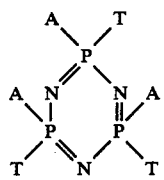

(II)

where T represents

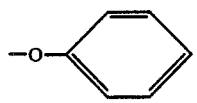

are extremely excellent in heat resistance and fire resistance and it is said that carbonaceous cloth laminated therewith are not burnt at all even heated to 300 ° C. in gaseous oxygen.

These compounds are described in U.S. Pat. No. 4,550,177, or "Journal of Polymer Science" : Polymer Chemistry Edition, vol. 22, p927–943 (1984), etc. According to the above mentioned literatures, the compound (1) is prepared in accordance with the following scheme

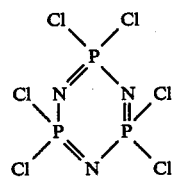

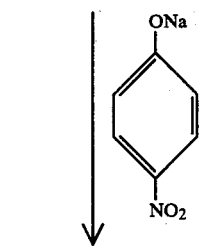

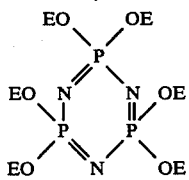

where E represents

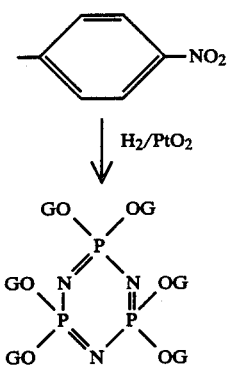

where G represents

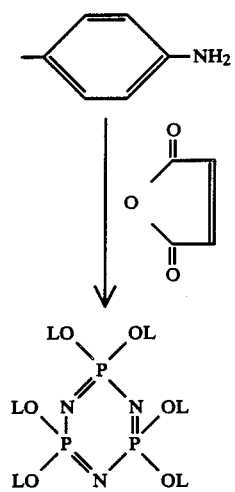

where L represents

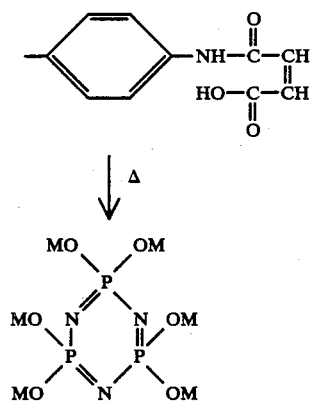

where M represents

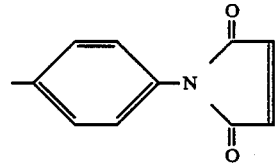

Furthermore, the compound (II) is prepared by similar steps excepting for replacing one-half amount of the nitrophenoxy group bonded in the first reaction step of the above-mentioned schemes with the phenoxy group.

Thus, the method described in these literatures is extremely complex including a plurality of steps, that is, a reaction between a trimer of cyclic phosphonitrile chloride and 4-nitrophenolate or a reaction between 4-nitrophenolate and phenolate, followed by hydrogen reduction of the nitro group under an elevated pressure, maleimidation of the resultant amino group and preparation of the aimed product through the ring closure by dehydration and, since the final yield is low, it can not be practiced from an economical point of view.

OBJECT OF THE INVENTION

The object of this invention is to provide novel phosphonitrile oligomers used as the starting material for polymers excellent in heat-resistance, cold-resistance, lubricility, electric insulation or chemical stability, as well as a novel process for producing them.

A further object of this invention will become apparent to those skilled in the art by referring to the following descriptions.

SUMMARY OF THE INVENTION

The present inventors have made an earnest study for overcoming the foregoing drawbacks in the known process and, as a result, have found that by reacting a phosphonitrile chloride oligomer represented by the general formula

(III)

where n is an integer of not less than 3, with an appropriate amount of N-(4-hydroxphenyl)maleimides represented by the general formula

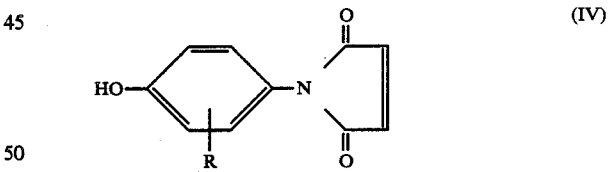

(IV)

where R represents a hydrogen atom, a halogen atom, a lower alkyl group, a lower alkoxy group or a lower alkoxy alkyl group, a compound represented by the formula

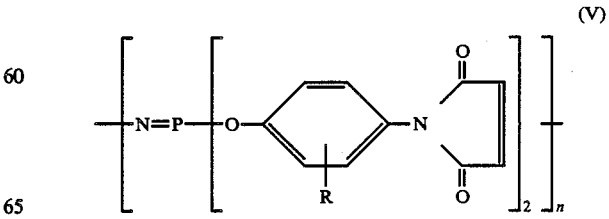

(V)

in which all of chlorine atoms of the phosphonitrile chloride oligomer are substitued with 4-maleimide phenoxygroups, or a compound represented by the formula

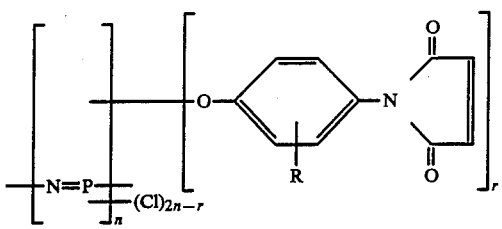
(VI)

in which chlorine atoms are partially substituted and where r is an integer from 1 to $2n-1$, can be obtained with ease at a high yield. We have also found that by reacting a compound represented by the formula (VI) with a hydroxy compound represented by the general formula $$Y-OH \qquad (VII)$$

where
Y represents:
an aryl group which may contain a halogen atom, a alkyl group, a lower alkoxy group or a lower alkoxy alkyl group,
an alkyl group which may have a side chain and contain a halogen atom or an alkoxy group, an alkenyl group which may have a side chain,
an alkynl group which may have a side chain,
an aralkyl group which may contain a halogen atom, a lower alkyl group or a lower alkoxy group or
a cycloalkyl group,
or an alkali metal-substituted compound thereof, a compound represented by the general formula

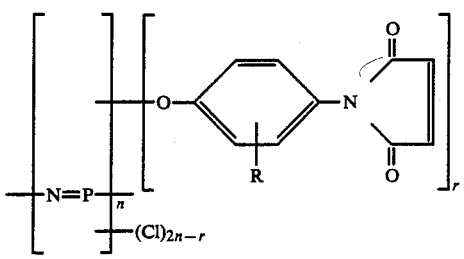
(VIII)

can also be obtained with ease.

Further, the present inventors have also found the following processes (2) and (3):

(2) a process for producing a compound represented by the formula (VIII) by reacting from 1 to $2n-1$ molar ratio of a hydroxy compound represented by the formula (VII) to 1 molar ratio of one or more of the phosphonitrile chloride oligomer represented by the formula (III) and then reacting N-(4-hydroxyphenyl)maleimides represented by the formula (IV) thereby substituting chlorine atoms remaining in the phosphonitrile nucleus with radical

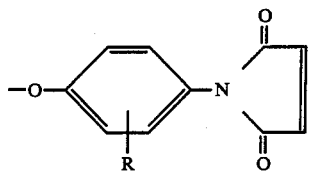

and;

(3) a process for producing a compound represented by the formula (VIII) by reacting a mixture of an N-(4-hydroxyphenyl)maleimide represented by the formula (IV) and a hydroxy compound represented by the formula (VII) (the mixing ratio being properly determined depending on the physical property required for the aimed product) with the phosphonitrile chloride oligomer represented by the formula (III).

By the way, the phosphonitrile oligomers containing maleimidophenoxy group in which one or more chlorine atoms remain in the phosphonitrile nucleus represented by the formula (VI) are novel substances, and further among the compounds represented by the formula (VIII), the compounds except for those in which R represents a hydrogen atom and Y represents a nonsubstituted phenyl group are novel substances not known so far.

This invention provides phosphonitrile oligomers represented by the formula

where R has the same meaning as above and r is an integer from 1 to $2n-1$.

Further, this invention also provides a process for producing phosphonitrile oligomers represented by the following formula

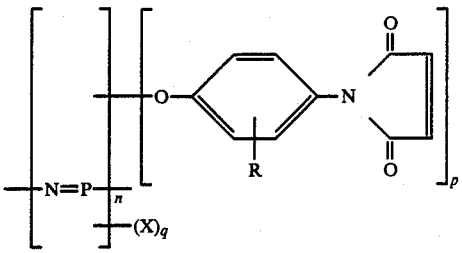

where,
R represents a hydrogen atom, a halogen atom, a lower alkyl group, a lower alkoxy group or a lower alkoxy alkyl group,
n is an integer of not less than 3,
X represents a chlorine atom or -OY group,
p is an integer from 1 to 2n,
q is an integer from 0 to $2n-1$, and
$p+q$ is 2n, wherein said process comprises reacting, one molar ratio of a phosphonitrile chloride oligomer represented by the following formula

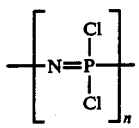

where n has the same meaning as described above, with one or more molar ratio of n-(hydroxyphenyl)maleimides represented by the formula

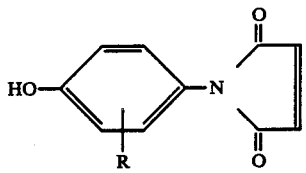

where R has the same meanings as above, and not less than 0 or greater molar ratio of a hydroxy compound represented by the formula

HO—Y  (VII)

where,
Y represents:
an aryl group which may have a halogen atom, a lower alkyl group, a lower alkoxy group or a lower alkoxy alkyl group, an alkyl group which may have a side chain and contain a halogen atom or an alkoxy group,
an alkenyl group or an alkynyl group which may have a side chain,
an aralkyl group which may contain a halogen atom, a lower alkyl group or a lower alkoxy group, or
a cycloalkyl group, in any orders.

DETAILED DESCRIPTION OF THE PREFERRED EMBODIMENTS OF THE INVENTION

Method of Operation

The reaction between a phosphonitrile chloride oligomer or an oligomer in which chlorine atoms are partially substituted with the YO-groups and the chlorine atoms are still retained therein, that is, an oligomer partially substituted with the YO-groups and the N-(4-hydroxyphenyl) maleimides is preferably carried out in an inactive organic solvent in the presence of a tertiary amine at a room temperature. The reaction time ranges from about 30 to 40 hours. The amount of N-(4-hydroxyphenyl)maleimides used to the phosphonitrile chloride oligomer is properly adjusted depending on the desired degree of substitution of the product substituted with maleimide phenoxy groups. A suitable amount of N-(4-hydroxyphenyl)maleimides to the oligomer partially substituted with the YO-groups is an equivalent amount or slightly in excess of the equivalent amount based on chlorine atoms remaining in the oligomer.

The reaction between the chlorine atoms bonded to the nucleus of the phosphonitrile oligomer and the N-(4-hydroxyphenyl)maleimides can be conducted with the latter being in the form of a metal phenolate. In this case, the reaction is proceeded under a normal temperature for about from 5 to 10 hours. However, since byproducts of unknown composition may some time be produced in this reaction, a method of using the tertiary amine as described above is preferred in order to obtain a product of high purity.

The reaction between the phosphontirile chloride oligomer or an oligomer in which the chlorine atoms are partially substituted with the group

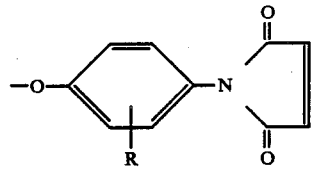

and chlorine atoms still retained therein and a hydroxy compound represented by YOH is reacted by processes which have been used for reactions between phosphonitrile chloride oligomers and YOH, i.e., the reaction is conducted by reacting both of them under the presence of a tertiary amine in an inactive organic solvent, or reacting the hydroxy compound in the form of a metal phenolate or metal alcoholate.

Although the reaction using the tertiary amine is proceeded even at a room temperature, it is preferred to apply heating at a refluxing temperature of the solvent about for approximately 3 to 8 hours.

In the case of reacting the phenolate or the alcoholate, it is preferred that a solution containing the reactants dissolved in a phenol or alcohol used as the starting material therefor or in an inactive organic solvent is added to the solution of a chlorine atom-retaining oligomer, and then reacted under a room temperature for about 1 to 5 hours and then reacted under refluxing temperature of the solvent for approximately 0.5 to 2 hours. Furthermore, the reaction between the chlorine atom-retaining oligomer and the hydroxy compound can also be proceeded by using an alkali metal carbonate as an acid acceptor in the solvent.

In the synthesis of the product entirely substituted with the maleimide phenoxy groups or partially substituted with the maleimide phenoxy groups or, furthermore, in the substitution reaction thereof with the YO-groups, the aimed product may be recovered after the completion of the substitution reaction by filtering the hydrochloride of the tertiary amine or metal chloride as the byproduct of substitution reaction, and then thoroughly distilling off the solvent from the filterate. If required, an aimed product can be purified by applying operations such as washing, neutralization, recrystallization, etc.

Phosphonitrile Chloride Oligomer

The phosphonitrile chloride oligomer used as the starting material in this invention is prepared as a reaction product of phosphorous pentachloride and ammonium chloride, that is, as a mixture of various kinds of oligomers in the form of

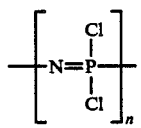

where n represents an integer of 3 or greater.

In this invention, the mixture can be used as it is, or the cyclic trimer or the cyclic tetramer hereinafter simply referred to as "3PNC" and "4PNC" respectively purified and isolated therefrom may be used alone or as an adequate mixture depending on the purpose of use of the final product.

Maleimide Derivative

As the N-(hydroxyphenyl)maleimides usable in the present invention, there can be mentioned, for example:
N-(4-hydroxyphenyl)maleimide,
N-(2-methyl-4-hydroxyphenyl)maleimide,
N-(2,6-dimethyl-4-hydroxyphenyl)maleimide,
N-(3,5-dimethyl-4-hydroxyphenyl)maleimide,
N-(3,6-dimethyl-4-hydroxyphenyl)maleimide,
N-2-ethyl-4-hydroxyphenyl)maleimide,
N-(2,6-diethyl-4-hydroxyphenyl)maleimide,
N-(2-methyl-3-ethyl-4-hydroxyphenyl)maleimide,
N-(2-propyl-4-hydroxyphenyl)maleimide,
N-(2-butyl-4-hydroxyphenyl)maleimide,
N-(2-methoxy-4-hydroxyphenyl)maleimide,
N-(2-methyl-3-methoxy-4-hydroxyphenyl)maleimide,
N-(2-ethoxy-3-ethyl-4-hydroxyphenyl)maleimide,
N-(2-propoxy-3-methyl-4-hydroxyphenyl)maleimide,
N-(2-butoxy-6-methyl-4-hydroxyphenyl)maleimide,
N-(2-chloro-4-hydroxyphenyl)maleimide,
N-(2,6-dichloro-4-hydroxyphenyl)maleimide,
with no particular restrictions only thereto. Among the compounds as described above, N-(4-hydroxyphenyl)maleimide is most readily utilizable industrially.

Hydroxy Compound

As the hydroxy compound usable in this invention, there can be mentioned, for example, methanol, ethanol, n-propanol, i-propanol, 2,2,2-trifluoroethanol, octafluoropentanol, allyl alcohol, propargyl alcohol, cyclohexanol, phenol, p-cresol, m-cresol, o-cresol, p-chlorophenol, m-chlorophenol, o-chlorophenol, p-bromophenol, m-bromophenol, o-bromophenol, p-methoxyphenol, m-methoxyphenol or o-methoxyphenol with no particular restriction only thereto. Among the hydroxy compounds, n-propyl alcohol, 2,2,2-trifluoroethanol, phenol or cresols can be used readily. In a case where the polymerizing reaction of substituent groups retained in the reaction product is desired, alcohols having unsaturated groups, for example, allyl alcohol or propargyl alcohol is used.

Tertiary Amine

As the tertiary amine usable in the present invention there can be mentioned for example, triethylamine, tripropylamine, tributylamine, trioctylamine, N,N-diethylpropylamine, N,N-dimethylcyclohexylamine, N,N-dimethylaniline, N,N-dimethyltoluidine, N,N-dimethyl benzylamine, triethylenediamine, qunuclidine, N-methylpyrrolidine, N-methylpiperidine, N,N-dimethylpiperadine, pyridine, α-picoline, δ-picoline, γ-picoline, 5-ethyl-2-picoline or trimethylpyridine with no particular restriction only thereto.

Further, the tertiary amines may be used as a mixture of two or more of them. The amount of the tertiary amine used is more than the equivalent amount, preferably, about from 1.2 to 2 equivalent amount of the N-(4-hydroxyphenyl) maleimides to be reacted therewith and the use of a greater amount has no substantial meaning. In the case of reacting the hydroxy compound with the tertiary amine, it is preferably used in an amount greater than the equivalent amount of the hydroxy compound to be reacted therewith. Among the tertiary amines, triethylamine, N,N-dimethylaniline, pyridines or picolines can be used with an industrial advantage.

By the substitution of chlorine atoms bonded to the nucleus of the phosphonitrile oligomer with the group

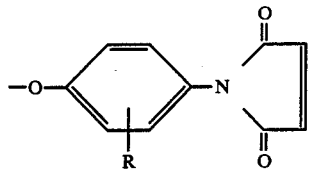

or the OY-group, the amount of the tertiary amine used can be saved by blowing an ammonia gas after the substitution has been progressed for about one-half or greater of the chlorine atoms initially bonded to the oligomer nucleus and in the case where the tertiary amine hydrochloride is present in the reaction system.

Organic Inactive Solvent

As the organic inactive solvent used in this invention, there can be mentioned, for example, benzene, toluene, xylene, monochlorobenzene, tetrahydrofuran and dioxane with no particular restrictions only thereto. Among the solvents, toluene, xylene, monochlobenzene, tetrahydrofuran can easily be used.

It is convenient in view of the operation to use the organic solvent in an amount ranging in ratio from 3 ml to 10 ml based on 1 g of the phosphonitrile chloride used.

EXAMPLE

The present invention will be explained more specifically below referring to examples. It should however, be noted that the present invention is no way limited only to these examples.

EXAMPLE 1

7.0 g of a mixture of phosphonitrile chloride oligomers comprising 54.6% of 3PNC, 15.0% of 4PNC and 30.4% of other phosphonitrile chloride oligomers (0.12 mol of chlorine content) was dissolved in 50 ml of tetrahydrofuran.

Into a 500 ml volume four-necked flask equipped with a stirrer, a thermometer, a reflux condenser and dropping funnel, 45.4 g (0.24 mol) of N-(4-hydroxyphenyl)maleimide, 38.0 g (0.48 mol) of pyridine and 200 ml of tetrahydrofuran were charged and the solution of the phosphonitrile chloride oligomer in tetrahydrofuran was added dropwise being stirred throughout for 30 minutes. The reaction was exothermic and, while the temperature was increased to a maximum temperature of 35° C., the reaction was conducted without applying any particular cooling procedure for 30 hours. After the completion of the reaction, pyridine hydrochloride as the byproduct of reaction was separated by filtration. About 150 ml of the solvent was distilled off from the filtrate under a reduced pressure and, when the resultant concentrate was poured into 200 ml of ice and water, a viscous blackish brown resinous product was deposited. The aqueous layer was removed by decantation, the residual resinous product was dissolved by adding 50 ml of tetrahydrofuran and the solution was agin poured into 200 ml of ice and water to obtain a viscous brown resinous product.

The product was dried under a reduced pressure to obtain 23.4 g of a viscous resinous product, which was estimated to be a substance having the structure represented by the formula

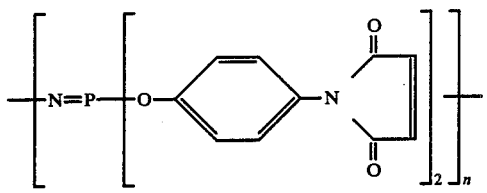

as a result of the infrared spectrum analysis and the analysis of gel permeation chromatography (hereinafter simply referred to as "GPC"). The content of hydrolyzable chlorine in the viscous brown resinous product was less than 0.01 %.

EXAMPLE 2

A phosphonitrile oligomer was synthesized using the same procedure as in Example 1 using 7.0 g of 3PNC (0.12 mol of chlorine content) instead of the mixture of the phosphonitrile chloride oligomers used in Example 1. The resultant product was a powdery pale brown substance and the yield was 24.2 g. The product had a melting point from 259 to 262.5 ° C. and it was confirmed to be a single constituent according to GPC and HPLC analysis. Furthermore, it was confirmed to be 2,2,4,4,6,6-hexakis(maleimidophenoxy)cyclotriphosphazene by infrared analysis. That is, the material was represented by the formula

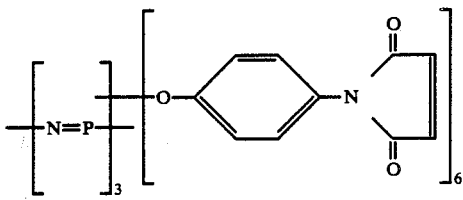

EXAMPLE 3

After charging 7.0 g of 3PNC (0.12 mol of chlorine content), 200 ml of tetrahydrofuran, 4.75 g (0.06 mol) of pyridine into a one liter volume four-necked flask equipped with a stirrer, a thermometer, a reflux condenser and a dropping funnel, a solution of 11.3 g (0.06 mol) of N-(4-hydroxyphenyl)maleimide dissolved in 50 ml of tetrahydrofuran was added dropwise being stirred throughout for 30 minutes. The reaction was exothermic and, while the temperature was increased to a maximum temperature of 35 ° C., the reaction was conducted without applying any particular cooling procedure at a room temperature for 10 hours. Then, the obtained solution was filtered to separate pyridine hydrochloride and the solvent was distilled off from the filtrate to obtain 15.7 g of a brown resinous product. The hydrolyzable chlorine content in the resinous product was measured to be 13.35% and, based on the calculation from the value, the resultant resinous product is a cyclotriphosphazene partially substituted with maleimide phenoxy groups in which 3.03 molar ratio of chlorine and 2.97 molar ratio of the group

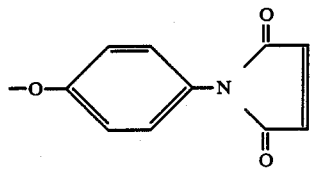

were bonded as a whole. The result of the GPC analysis also showed that the product was a mixture mainly composed of a compound of the formula

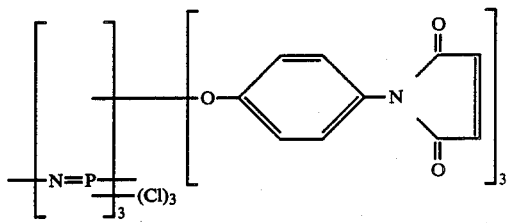

EXAMPLE 4

Into a 500 ml volume four-necked flask equipped with a stirrer, a thermometer, a reflux condenser and a dropping funnel, 15.6 g of a mixture mainly composed of a compound represented by the formula

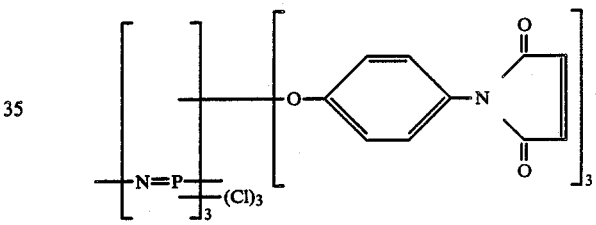

synthesized in Example 3 and 200 ml of tetrahydrofuran were charged and, while stirring the solution, a tetrahydrofuran solution of sodium phenolate (prepared by reacting 6.77 g (0.072 mol) of phenol and 1.51 g (0.066 mol) of metal sodium in 50 ml of tetrahydrofuran) was added under a room temperature. The reaction was exothermic and while the temperature was increased to a maximum temperature of 40 ° C., the reaction was continued under a room temperature without applying any particular cooling procedure. After reacting for 5 hours, the temperature was further elevated and refluxing was conducted for 3 hours. After the reaction had been completed, the obtained solution was filtered to separate NaCl as the byproduct of the reaction, tetrahydrofuran was distilled off from the filtrate and the residue was dried to solidness. Then, after adding 50 ml of benzene to dissolve the residue again, it was washed with 50 ml of water, twice each time with 30 ml of a warm KOH solution (5 wt%) and further washed twice each time with 50 ml of water. After confirming that the pH value of the aqueous layer was neutral, the organic layer was separated and dehydrated with anhydrous magnesium sulfate and, after dehydration, benzene was thoroughly distilled off to obtain 10.3 g of brown resinous solids.

As a result of IR absorption spectrum analysis and the GPC analysis, the substance was confirmed to be a mixture mainly composed of

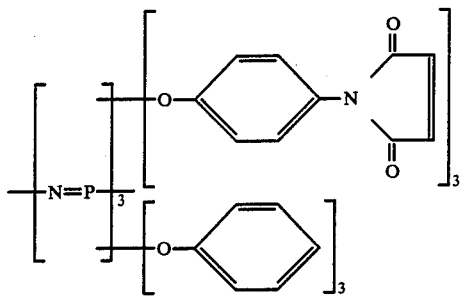

Furthermore, the content of the hydrolyzable chlorine in the brown resinous solids was less than 0.01%.

EXAMPLE 5

A product which was partially substituted with the maleimide phenoxy groups in the same procedures as in Example 3 was synthesized and, without separating it from the reaction solution, 12.7 g of a 28% solution of sodium methylate (0.006 mol of sodium methylate) in methanol was added dropwise under a room temperature for 15 minutes. While the reaction was exothermic, reaction temperature rose spontaneously to refluxing temperature, but without supplying any particular cooling procedures the reaction was conducted for 5 hours. NaCl as the byproduct of reaction was separated by filtration and, in the same subsequent procedures as in Example 4, 10.9 g (yield 96.4%) of viscous brown resinous solids were obtained. As the result of the IR absorption spectrum analysis and GPC analysis, the substance was confirmed to be a mixture mainly composed of a compound of the formula

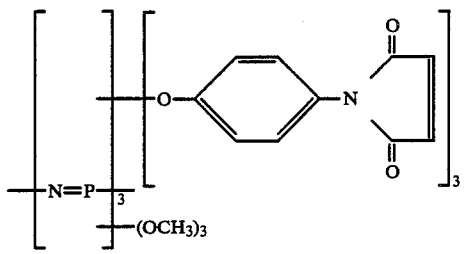

Furthermore, the content of the hydrolyzable chlorine in the viscous brown resinous solids was less than 0.01%.

EXAMPLE 6

A tetrahydrofuran solution of a product which had been substituted partially with maleimide phenoxy groups obtained in the same procedures as in Example 3 was charged in a 500 ml volume reaction vessel. Then after dropping 20.1 g of a 40% tetrahydrofuran solution of sodium-2,2,2-trifluoroethylate (0.066 mol of sodium 2,2,2-trifluoroethylate) under a room temperature for 15 minutes, the reaction was conducted and completed at a room temperature for 5 hours. NaCl as the byproduct of reaction was separated by filtration by the same subsequent procedures as in Example 4, to obtain 17.0 g (90.2% yield) of a viscous resinous product. As a result of IR absorption spectrum analysis and GPC analysis, the substance was confirmed to be a mixture mainly composed for a compound of the formula

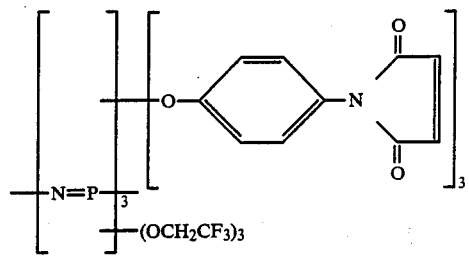

The content of the hydrolyzable chlorine in the substance was less than 0.01%.

EXAMPLE 7

Into a 500 ml volume four-necked flask equipped with a stirrer, a thermometer, a reflux condenser and a dropping funnel, a solution of sodium phenolate in tetrahydrofuran (prepared by reacting 6.21 g (0.066 mol) of phenol and 1.37 g (0.006 mol) of metal sodium in 50 ml of tetrahydrofuran) was charged, to which a solution of 3PNC in tetrahydrofuran prepared separately (prepared by dissolving 7.0 g of 3PNC having the chlorine content of 0.12 mol in 50 ml of tetrahydrofuran) was added under a room temperature. The reaction was exothermic and, while the temperature was increased to a maximum temperature of 40° C., the reaction was conducted without applying any particular cooling procedure under a room temperature for 5 hours. When the content of the hydrolyzable chlorine in the reaction mixture was measured at this point, the content was 21.64% and, based on the calculation from the value, the resultant product partially substituted with the phenoxy groups contained 3.02 mol of chlorine and 2.98 mol of the groups

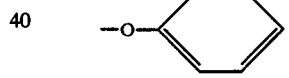

bonded thereto as a whole. As the result of the GPC analysis, it was confirmed to be a mixture mainly composed of a compound of the formula

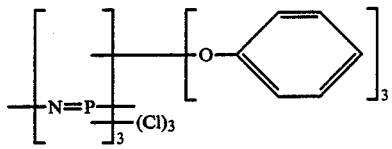

Then, NaCl as the byproduct of reaction was separated by filtering the reaction solution. The filtrate and 22.7 g (0.12 mol) of N-(4-hydroxyphenyl)maleimide were charged in a one liter volume reaction vessel and, after dropping 19.0 g (0.24 mol) of pyridine under a room temperature for 10 minutes, they were reacted under the room temperature for 7 hours. After the reaction was completed, pyridine hydrochloride as the byproduct of reaction was separated by filtration and, in the same subsequent procedures as in Example 1, 18.9 g (yield 91.5%) of a viscous brown resinous product was obtained. As a result of IR absorption spectrum analysis and GPC analysis, the substance was confirmed to be a mixture composed of a compound of the formula

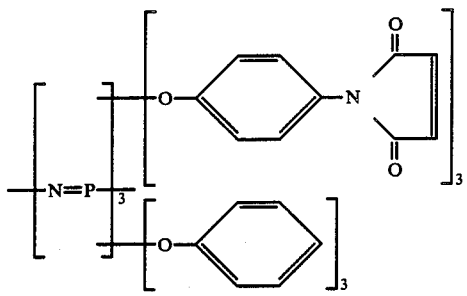

The content of the hydrolyzable chlorine in the viscous brown resinous product was less than 0.01%.

What is claimed is:

1. A process for producing a phosphonitrile oligomer having a repeating unit of the formula

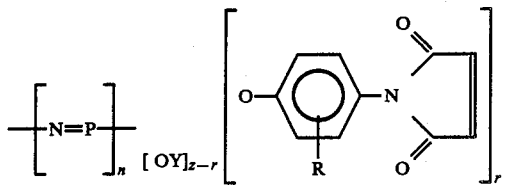

wherein
R represents a hydrogen atom, a halogen atom, a lower alkyl group, a lower alkoxy group or a lower alkoxyalkyl group, Y represents an unsubstituted aryl group, an aryl group having a substituent selected from the group consisting of halogen, ower alkyl, lower alkoxy and lower alkoxyalkyl,
an unsubstituted alkyl group, an alkyl group having a substituent selected from the group consisting of halogen and alkoxy, an alkenyl group, an alkynyl group, an unsubstituted aralkyl group, an aralkyl group having a substituent selected from the group consisting of halogen, lower alkyl and lower alkoxy, or a cycloalkyl group, n is an integer of not less than 3, and in each repeating unit r is an integer of 0 to 2, wherein in at least one repeating r is not 0 and wherein in at least one repeating unit r is 0 or 1, which process comprises reacting a phosphonitrile chloride oligomer represented by the formula

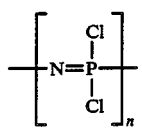

with a maleimide derivative represented by the formula

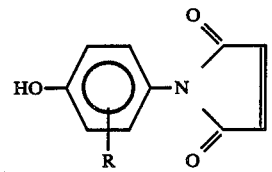

and a hydroxy compound represented by the formula HO—Y.

2. The process according to claim 1, wherein the phosphonitrile chloride oligomer is first reacted with the maleimide derivative, and is subsequently reacted with the hydroxy compound.

3. The process according to claim 1, wherein the phosphonitrile chloride oligomer is first reacted with the hydroxy compound, and is subsequently reacted with the maleimide derivative.

4. The process according to claim 1, wherein the phosphonitrile chloride oligomer is reacted with a mixture of the maleimide derivative and the hydroxy compound.

5. The process according to any one of claims 1–4, wherein the phosphonitrile chloride oligomer is a cyclic trimer.

6. The process according to any one of claims 1–4, wherein the phosphonitrile chloride oligomer is a cyclic tetramer.

7. The process according to any one of claims 1–4, wherein the reaction is carried out in the presence of a tertiary amine.

8. The process according to any one of claims 1–4, wherein the reaction is carried out in an inert solvent.

* * * * *